United States Patent
Li et al.

(10) Patent No.: US 10,764,470 B1
(45) Date of Patent: Sep. 1, 2020

(54) TILE BASED COLOR SPACE TRANSFORMATION

(71) Applicant: Xerox Corporation, Norwalk, CT (US)

(72) Inventors: Xing Li, Webster, NY (US); Peter McCandlish, Penfield, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/298,190

(22) Filed: Mar. 11, 2019

(51) Int. Cl.
*H04N 1/60* (2006.01)
*H04N 1/58* (2006.01)

(52) U.S. Cl.
CPC .......... *H04N 1/6005* (2013.01); *H04N 1/58* (2013.01); *H04N 1/6008* (2013.01); *H04N 1/6019* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,146,058 B2 * | 12/2006 | Grohs | ...................... | H04N 1/60 382/243 |
| 7,199,900 B2 * | 4/2007 | Ogatsu | ............... | B41F 27/1206 358/1.9 |
| 8,165,388 B2 | 4/2012 | Li | | |
| 8,775,281 B2 | 7/2014 | Li | | |
| 9,025,222 B1 | 5/2015 | Li et al. | | |
| 10,079,959 B2 * | 9/2018 | Prenn | ................... | H04N 1/2104 |
| 10,582,091 B1 * | 3/2020 | Li | ............................ | H04N 1/46 |
| 2009/0195801 A1 * | 8/2009 | Malik | ................ | H04N 1/00002 358/1.9 |

FOREIGN PATENT DOCUMENTS

JP 2012049649 A * 3/2012

OTHER PUBLICATIONS

"Control of Color Imaging Systems: Analysis and Design", CRC Press (2009), ISBN-13: 9780849337468.
"Digital Color Imaging Handbook", 1st Ed., CRC Press (2003), ISBN-13: 97808-4930-9007.

* cited by examiner

Primary Examiner — Barbara D Reinier
(74) Attorney, Agent, or Firm — Fay Sharpe LLP

(57) ABSTRACT

A system and method for tile type based color space transformation improves the performance and image quality of multifunction devices. The disclosed embodiments transform an input image on a tile by tile basis. If a tile is detected as neutral, simple 1D L* to CMYK Tone Reproduction Curves or Look-Up-Tables are used to convert the input pixels of the tile in L*a*b* to output pixels in CMYK. If a tile is detected as containing color content, then the input pixels are chrominance adjusted and subsequently converted to CMYK using regular tetrahedral interpolation.

20 Claims, 6 Drawing Sheets

TILE BASED COLOR SPACE TRANSFORMATION

CROSS-REFERENCE TO RELATED APPLICATION

This application is related to U.S. patent application Ser. No. 16/298,439, filed Mar. 11, 2019 and titled AUTO-COLOR COPY IN SOFTWARE BASED IMAGE PATH, which is incorporated herein by reference in its entirety.

BACKGROUND

The subject disclosure relates to the printing arts, the copying/scanning arts, the image processing arts, the color processing arts, spot color printing, and the like.

While historically images were captured using photographic film, modern digital devices (such as scanners, cameras, etc.) capture images as pixels electronically, and most such digital devices capture images in a color space referred to as RGB, or red-green-blue color space. The RGB color space is utilized by image capture devices because such devices commonly include sensors that distinguish between the red, green, and blue colors.

When processing images captured by digital devices to make color corrections, remove undesirable artifacts, improve image resolution, suppress background, prepare images for printing or display, etc. (which is sometimes referred to as image path processing) it is often useful to first convert the electronic images into a color space that is device independent, such as the CIEL*a*b* color space.

The L*a*b* color space has an L dimension for lightness and a* and b* that are color-component dimensions (green-red and blue-yellow, respectively). The L*a*b* color space includes all perceivable colors, which means that its gamut exceeds those of the RGB and CMYK color spaces. The L*a*b* color space is device independent, which means that the colors are defined independent of their nature of creation or the device they are displayed on.

Printing devices generally operate in a smaller gamut color space, such as the RGB or CMYK color spaces, that are named based on the colors of the marking materials (e.g. inks, toners, etc.) used; such as red, green, and blue (RGB); or cyan, magenta, yellow, and black (CMYK). Thus, in order to print images represented in the L*a*b* color space, the image data must be transformed to either the RGB or CMYK color space.

Color space transformations using methods and formulae more complex than 1D look up tables, such as for example and without limitation tetrahedral interpolation, are one of the more computationally expensive functions in color image path for digital copiers and multifunction devices. In a software-based image path, it is desirable to reduce the amount of arithmetic processing and processing time of color space transformations in order to improve the overall system performance.

Accordingly, a method and system to improve color space conversion from L*a*b* to CMYK with increased efficiency, faster processing, and improved quality is needed.

INCORPORATION BY REFERENCE

"Control of Color Imaging Systems: Analysis and Design", CRC Press (2009), ISBN-13: 9780849337468
"Digital Color Imaging Handbook", 1st Ed., CRC Press (2003), ISBN-13: 97808-4930-9007
U.S. Pat. No. 8,165,388 to Xing Li., issued Apr. 24, 2012 and titled NEUTRAL PIXEL DETECTION IN AN IMAGE PATH;
U.S. Pat. No. 8,775,281 to Xing Li, issued on Jul. 8, 2014 and titled COLORDETECTION FOR TIERED BILLING IN COPY AND PRINT JOBS; and,
U.S. Pat. No. 9,025,222 to Xing Li et al., issued May 5, 2015 and titled SCANNER CALIBRATION USING INVERSE MATRIX are incorporated herein by reference in their entirety.

BRIEF DESCRIPTION

Accordingly, described herein in various embodiments is a tile type based color space transformation method that improves the speed of image processing. Specifically, the color space transformation method is selected on a tile by tile basis. In the disclosed method, if a tile is detected as neutral, simple 1D L* to CMYK TRCs are used to convert the input pixels in CIEL*a*b* to output pixels in CMYK; if a tile is detected as containing color content, then the input pixels are chrominance adjusted first and then converted to CMYK using formula which is more complex than 1D table looking up, for example and without limitation, regular tetrahedral interpolation. The disclosed method offers a significant savings in computation time for most jobs as 1D look-up tables are faster to execute than interpolation methods by at least an order of magnitude. For example, tetrahedral interpolation of an 8.5"×11" page at 600 dpi may process in about ~300 msec while 1D look up tables of the same page may process in ~30 msec. With the chrominance adjustment step, which sets the a* value and the b* value to 128 for neutral pixels, and properly designed 1D L* to CMYK TRCs, the disclosed methods and systems avoid potential switching artifacts due to different treatments for neutral pixels. The disclosed method can also be used in other conversions such as CIELab to YCbCr conversion. The disclosed methods fit nicely into tile type based processing frameworks in software based image path. There is no extra overhead in tile based neutral detection as the neutral based detection is a needed step in page-level neutral/color detection.

According to one embodiment, there is provided a method for tile type based color space transformation. The method includes, with at least one image signal processor, splitting an input image into a plurality of tiles where each tile is composed of a plurality of pixels. The method further includes performing a color space transformation on a tile-by-tile basis. The at least one image signal processor performs the color space transformation by determining the presence of color data within a tile of the plurality of tiles. Upon a determination that no color data is present within the tile, the at least one image signal processor converts the plurality of pixels of the tile from a device independent color space to a device dependent color space via a one-dimensional look-up table. Upon a determination that color data is present within a tile, the at least one image signal processor adjusts the chrominance of neutral pixels of the plurality of pixels and subsequently converts the plurality of pixels from the device independent color space to the device dependent color space using a method more complex than one-dimensional look up tables.

According to another embodiment, there is provided a multifunction device for tile type based color space transformation. The multifunction device includes at least one image signal processor and a memory in communication therewith. The memory stores instructions which are executed by the at least one image signal processor to receive an input image and separate the input image into a plurality of tiles, wherein each tile of the plurality of tiles comprises a plurality of pixels. The instructions which are executed by the at least one image signal processor also determine the presence of color data within a tile of the plurality of tiles. Upon a determination that no color data is present within the tile, the instructions provide for converting the plurality of pixels of the tile from a device independent color space to a device dependent color space via a one-dimensional look-up table. Upon a determination that color data is present within a tile, the instructions provide for performing a chrominance adjustment on neutral pixels of the plurality of pixels and then converting the plurality of pixels from the device independent color space to the device dependent color space using a method more complex than one-dimensional look up tables.

According to another embodiment, there is provided a system for tile type based color space transformation. The system includes at least one image signal processor configured to receive an input image and a memory in communication therewith. Also included is an image tile extraction module in communication with the at least one image signal processor configured to split the input image into a plurality of tiles, each tile comprising a plurality of pixels. A color conversion module in communication with the at least one image signal processor is configured to convert each tile of the plurality of tiles from a device dependent color space to a device independent color space. A color detection module, also in communication with the at least one image signal processor, is configured to detect a presence and/or an absence of color data within each tile of the plurality of tiles. The system also includes a 1D conversion module in communication with the at least one image signal processor, wherein upon detection of the absence of color data within a tile of the plurality of tiles, the 1D conversion module converts the tile from the device independent color space to a device dependent color space using 1D look up tables. The system also includes an adjustment module in communication with the at least one image signal processor, wherein upon detection of the presence of color data within a tile of the plurality of tiles, the adjustment module adjusts the chrominance of each neutral pixel of the plurality of pixels. The system also includes a transformation module in communication with the at least one image signal processor, wherein upon detection of the presence of color data within a tile of the plurality of tiles the transformation module converts the tile from the device independent color space to a device dependent color space utilizing but not limited to tetrahedral interpolation.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION

Figure 1:
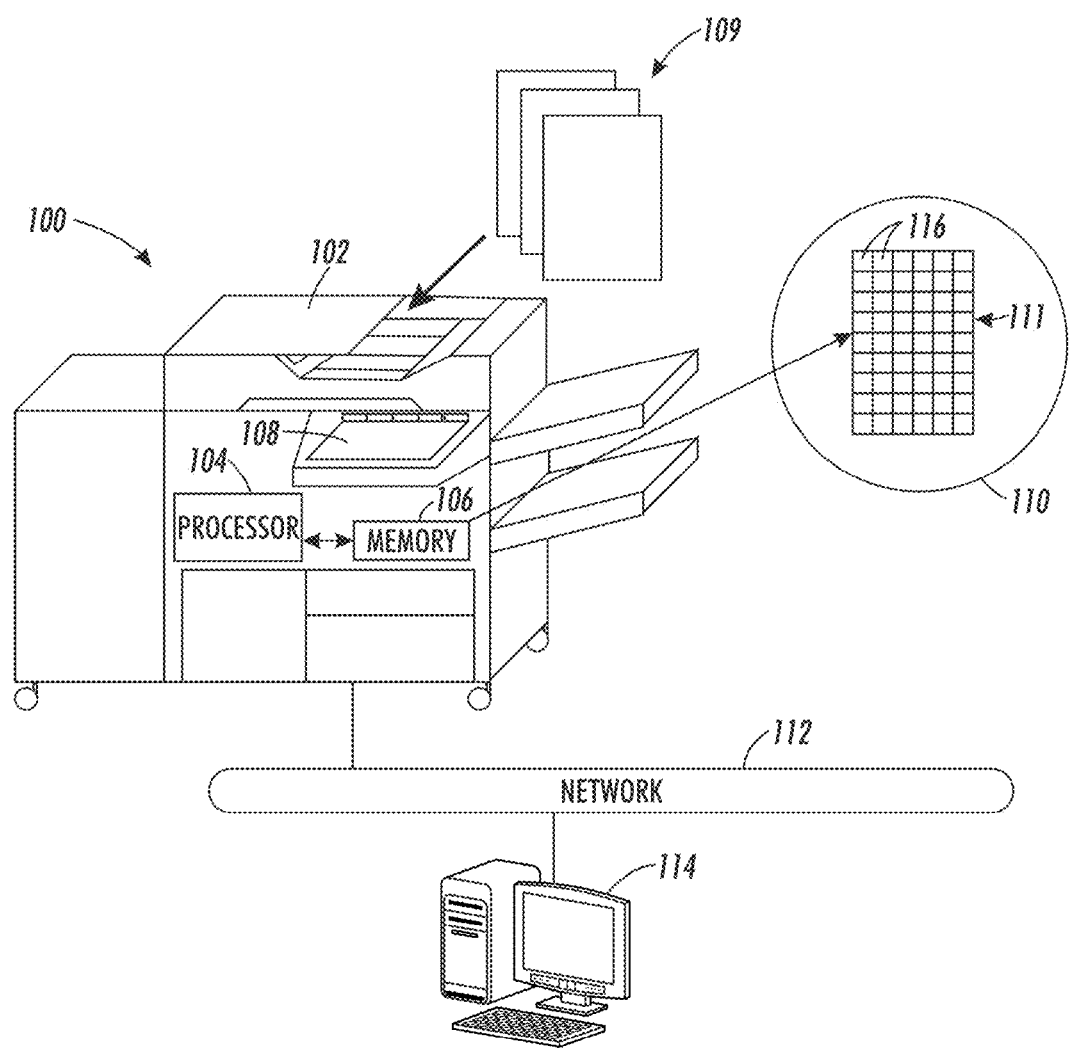
FIG. 1 is an illustration of a multifunction system for tile type based color conversion in accordance with one embodiment of the subject application.

One or more embodiments will now be described with reference to the attached drawings, wherein like reference numerals are used to refer to like elements throughout. Aspects of exemplary embodiments related to systems and methods for color image printing are described herein. In particular, disclosed herein are embodiments utilizing a tile type based color space transformation to increase color image processing speed and efficiency, while improving output documents. In addition, example embodiments are presented hereinafter referring to color space conversion from L*a*b* to CMYK, and the like, however, application of the systems and methods set forth can be made in other areas, as will be appreciated by those skilled in the art.

Non-Limiting Definitions

A "gamut" is a subset of color values of a given color space as defined by the spectrum of light, i.e., the distribution of light energy versus wavelength, interacting with the spectral sensitivities of the eye's light receptors and the colorants on the substrate. The gamut of a color marking device, for example, is a multi-dimensional color space having a given volume with the axes of the space being defined by the pigments used in the colorants of the primary colors. Each of the primary colors is transferred to the image-receiving medium. The color gamut is defined by the interaction of the primary colors and is limited by an amount of colorant that can be deposited on the image-receiving medium.

A "Device-Independent Color Space" is a color space that in no way depends on any measurement or color reproduction device. CIE XYZ tristimulus color space is one example of a device-independent color space. Other common device-independent color spaces are CIE L*u*v*, CIE L*a*b*, and LCH, which are obtained from XYZ using non-linear transformations and are well understood in this art.

A "Device-Dependent Color Space" is a color space that, in at least one way, depends on any measurement or color reproduction device. An example of a device-dependent color space is monitor RGB space or printer CMYK space.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Turning now to FIG. 1, there is shown an example system 100 that may be used for tile type based color conversion processing of documents in accordance with the example embodiments described herein. The system 100 addresses the need for systems and methods that enable document processing devices, such as multifunction peripheral devices, print servers, personal computers, and the like, to improve performance by speeding up the color space transformation function, resulting in faster and more efficient color document reproduction and processing, as well as improved quality of the color images printed by such devices. It will be appreciated that the various components depicted in FIG. 1 are for purposes of illustrating aspects of the subject application and that other similar components implemented via hardware, software, or a combination thereof, are capable of being substituted therein.

It will be appreciated that the system 100 of FIG. 1 is capable of implementation using a distributed computing environment, such as a computer network 112, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or any suitable combination thereof. Accordingly, such a computer network 112 comprises physical layers and transport layers, as illustrated by various conventional data transport mechanisms, such as, for example and without limitation, Token-Ring, Ethernet, or other wireless or wire-based data communication mechanisms. Furthermore, while depicted in FIG. 1 as a networked set of components, the system and method are capable of implementation on a stand-alone device adapted to perform the methods described herein.

The system 100 includes a multifunction peripheral device 102, representative of any computing system, which comprises at least a processor 104 (described in greater detail as the processor 202 of FIG. 2) that executes, and a memory 106 (described in greater detail below as the memory 204 of FIG. 2) that stores computer-executable instructions for providing the various functions, calculations, segmentations, selections, and the like, described herein. It will be appreciated that the multifunction peripheral device 102, is suitably adapted to perform a variety of document processing operations, including, for example and without limitation, scanning, copying, facsimile transmissions, printing, electronic mail communications, document management, document storage, or the like.

In accordance with one embodiment of the subject application, the multifunction peripheral device 102 is capable of being employed as one possible hardware configuration to support the systems and methods described herein. The skilled artisan will further appreciate that although the multifunction peripheral device 102 is illustrated as a standalone document processing device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application. It will further be appreciated that the multifunction peripheral device 102 may include a computer server, workstation, personal computer, combination thereof, or any other computing device.

The multifunction peripheral device 102 includes at least one processor 104 (see, e.g. FIG. 2), a system memory 106 (see, e.g. FIG. 2), and a system bus (such as the bus 212 of FIG. 2) that couples various system components including the system memory 106 to the at least one processor 104. The at least one processor 104 can be any of various commercially available processors. The at least one processor 104 can be variously embodied, such as by a single-core processor, a dual-core processor (or more generally by a multiple-core processor), a digital processor and cooperating math coprocessor, a digital controller, or the like. The at least one processor 104, in addition to controlling the operation of the multifunction peripheral device 102, executes instructions stored in memory 106 for performing the methods outlined in FIGS. 3 and 4 as described more fully below.

The multifunction peripheral device 102 typically includes at least some form of computer readable media. Computer readable media can be any available media that can be accessed by the multifunction peripheral device 102. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above can also be included within the scope of computer readable media.

A user may enter commands and information into the multifunction peripheral device 102 through an input device 108 (see, e.g. FIG. 2) such as a touch-screen interface, a keyboard, a pointing device, such as a mouse, stylus, voice input, or graphical tablet. The multifunction peripheral device 102 is capable of operating in a networked environment using logical and/or physical connections to one or more remote computers, such as a remote computer(s), depicted as the network 112 of FIG. 1. The logical connections depicted include a local area network (LAN) and a wide area network (WAN). Such networking environments are commonplace in offices, enterprise-wide computer networks, intranets and the Internet. Additional functioning of the multifunction peripheral device 102 is discussed in greater detail below with respect to the example multifunction peripheral device system 200 of FIG. 2.

According to one embodiment, the memory 106 stores an input image 110 of an original document 109 generated via operations of the multifunction peripheral device 102. As will be appreciated by those skilled in the art, the original document 109 may comprise one or more physical pages. While the input image 110 is illustrated as a single page 111 in FIG. 1, it is to be appreciated that the input image 110 includes data from each page if indeed the original document 109 comprises multiple pages. Furthermore, the input image 110 of the document may include text portions and image portions. It will be appreciated that the multifunction peripheral device 102 may receive the input image 110 via electronic communication thereof via the network 112, via digital media, or the like. In some embodiments, the multifunction peripheral device 102 generates the input image 110 via scanning of a hardcopy document 109, as will be understood by those skilled in the art. In other embodiments, the input image 110 may be further processed such that the image data of the input image 110 is separated into one or more pages 111, corresponding to each page of physical document 109.

As illustrated in FIG. 1, the system 100 may also include a user device 114 in data communication with the network 112. It will be appreciated that the illustration of the user device 114 as a personal computer is for example purposes only, and the subject application is capable of implementation via any suitable computing device including, for example and without limitation, a netbook computer, a laptop computer, a workstation computer, a smartphone, a personal data assistant, a web-enabled cellular telephone, a smart phone, a proprietary network device, or other web-enabled electronic device.

Although not shown, the user device 114 may include a processor, system memory, system storage, buses that couple various system components including the system memory to the processing unit, and the like. The user device 114 may be suitably configured to interact with the multifunction device 102, to access the data storage, submit color selections, submit job processing options, display color editors, generate a graphical user interface, and otherwise interact with users, and the like. In embodiments wherein the user device 114 is separate from the multifunction device 102, the user device 114 may include a web-browser, dedicated application, or other thin client interface, e.g., stored in memory, which is operable to interact with the multifunction device 102. It will be appreciated that the processor and memory of such a standalone user device 114 can be configured as set forth above with respect to the at least one processor 104 and memory 106 of the multifunction device 102.

It will be appreciated that the data communications between the multifunction peripheral device 102 and the user device 114 may be accomplished via any suitable channel of data communications via the network 112 known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications. In accordance with one embodiment of the subject application, the user device 114 is suitably configured to interact with the multifunction peripheral device 102 to facilitate document processing, send one or more documents to the device 102 for processing, and the like.

The memory 106 may represent any type of non-transitory computer readable medium such as random-access memory (RAM), magnetic disk or tape, optical disk, flash memory, or holographic memory. In one embodiment, the memory 106 comprises a combination of random-access memory and read only memory. In some embodiments, the at least one processor 104 and memory 106 may be combined in a single chip. Memory 106 may store data the processed in the method as well as the instructions for performing the exemplary method.

The at least one processor 104 can be variously embodied, such as by a single core processor, a dual core processor (or more generally by a multiple core processor), a digital processor and cooperating math coprocessor, a digital controller, or the like. The at least one processor 104, in addition to controlling the operation of the computer 102, executes instructions stored in memory 106 for performing the method outlined in FIG. 5.

Figure 2:
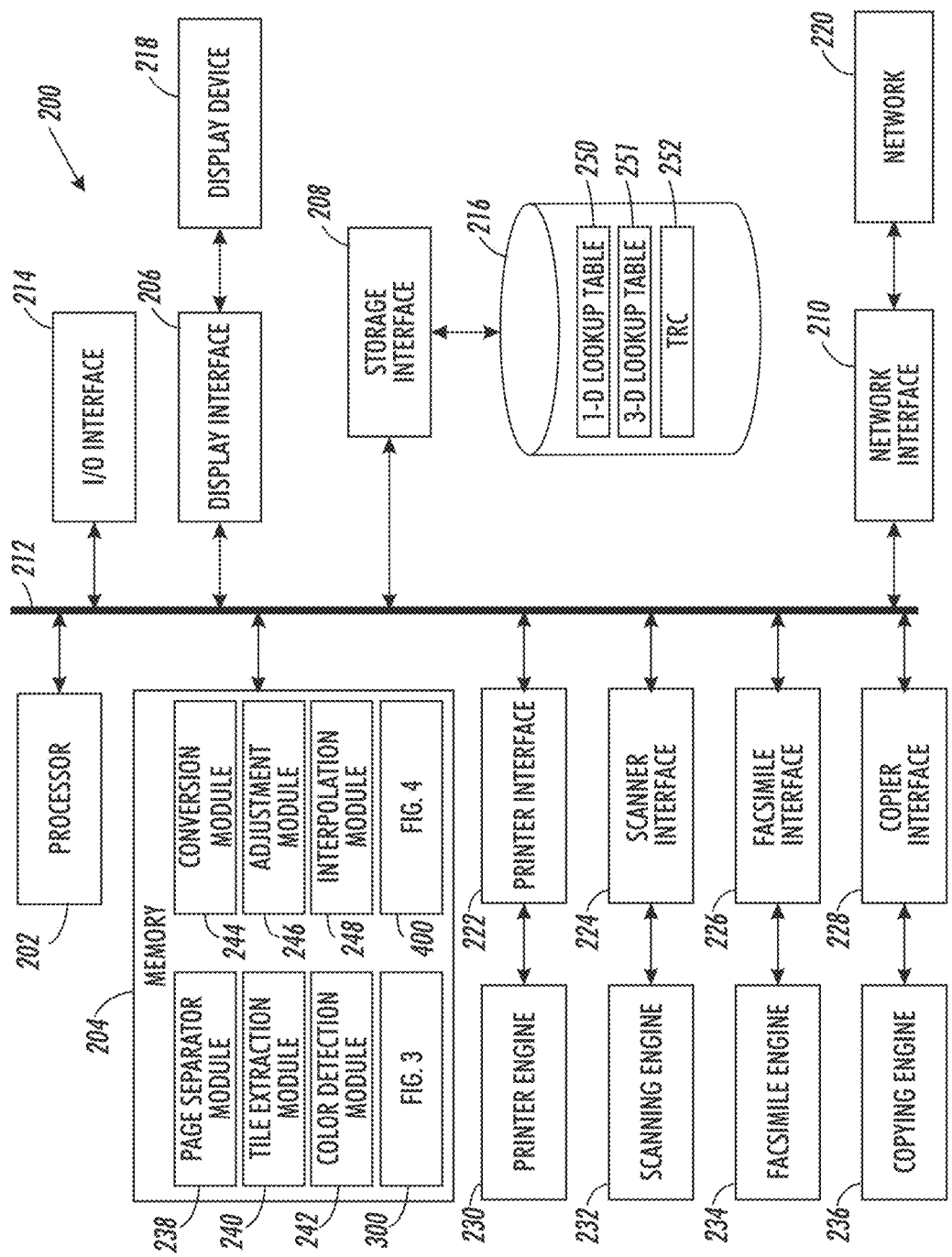
FIG. 2 is a block diagram of a multifunction system for tile type based color conversion in accordance with one embodiment of the subject application.

Turning now to FIG. 2, illustrated is a representative multifunction peripheral device 200 (depicted in FIG. 1 as the multifunction peripheral device 102) that facilitates tile type based color conversion in connection with one embodiment of the subject application. The multifunction peripheral device 200 includes at least one processor unit 202 (shown as the at least one processor 104 in FIG. 1) which is advantageously placed in data communication with memory 204 (shown as the memory 106 in FIG. 1), which may include, for example and without limitation, non-volatile read only memory, volatile read only memory, random access memory or a combination thereof, a display interface 206, a storage interface 208, and a network interface 210. In one embodiment, interfacing with the foregoing modules is suitably accomplished via a bus 212. The at least one processor 202 executes, and the memory 204 stores computer-executable instructions for performing the various functions, methods, steps, techniques, and the like, described herein. The at least one processor 202 and memory 204 may be integral to each other or remote but operably coupled to each other. It is to be appreciated that in some embodiments, the at least one processor 202 includes processor of the multifunction device 200 and the processor of a user device 114.

The memory 204 suitably includes firmware, such as static data or fixed instructions, such as BIOS, system functions, configuration data, and other routines used for the operation of the multifunction peripheral device 200 via the at least one processor 202. The memory 204 is further capable of providing a storage area for data and instructions associated with applications and data handling accomplished by the at least one processor 202. The memory 204 may further include one or more instructions (such as instructions to facilitate the image path 300 of FIG. 3 and 400 of FIG. 4), or modules, configured to be executed by the at least one processor 202 to perform one or more operations, such as operations associated with the multifunction peripheral device 200. The one or more modules are described in greater detail below.

The display interface 206 receives data or instructions from other components on the bus 212, which data is specific to generating a display to facilitate a user interface. The display interface 206 suitably provides output to a display device 218, suitably a video display such as a monitor, LCD, plasma, or any other suitable visual output device as will be appreciated by one of ordinary skill in the art.

As will be appreciated by those skilled in the art, the storage interface 208 is configured to provide a mechanism for non-volatile, bulk or long-term storage of data or instructions in the computer system. The storage interface 208 suitably uses a storage mechanism, such as storage 216, suitably comprised of a disk, tape, CD, DVD, or other relatively higher capacity addressable or serial storage medium. The storage 216 may store look-up tables such as 1-D look-up table 250 and 3-D look up table 251 and sets of tone reproduction curves 252.

The network interface 210 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration of FIG. 2, the network interface 210 is connected to a physical network 220, suitably comprised of a local area network, wide area network, or a combination thereof.

An input/output interface 214 in data communication with the bus 212 is suitably connected with input devices, such as a keyboard, mouse, pointing device, touch screen inputs, or the like. In addition, the input/output interface 214 is further capable of data input and output to or from a peripheral interface, such as a USB, universal serial bus output, SCSI, IEEE 1394 output, or any other interface as may be appropriate for a selected application.

Also, in data communication with the bus 212, are interfaces to one or more document processing engines. As illustrated in FIG. 2, the multifunction peripheral device 200 includes a printer interface 222, a scanner interface 224, a copier interface 228, and a facsimile interface 226. According to one embodiment of the subject application, the preceding interfaces 222-228 facilitate respective communication with a printer engine 230, a scanning engine 232, a facsimile engine 234, and a copying engine 236. It is to be appreciated that the multifunction peripheral device 200 suitably accomplishes one or more document processing functions.

It will be appreciated that the printer engine 230 suitably enables the output of physical documents representing an electronic document communicated to the multifunction peripheral device 200. It will also be appreciated that the scanning engine 232 is suitably adapted to receive hard copy documents, such as document 109 of FIG. 1, and generate electronic image data therefrom. According to certain embodiments of the subject application, the scanning engine 232 is capable of generating such image data from tangible documents in a variety of forms, including, for example and without limitation, bitmapped data, vector data, page description language formatted data, and the like. The copying engine 236 is suitably adapted to operate in conjunction with the scanning engine 232 and the printer engine 230 so as to generate tangible copies of input documents, as will be appreciated by those skilled in the art. In accordance with one embodiment, the facsimile engine 234 communicates to or from external facsimile devices (not shown).

As illustrated in FIG. 2, the multifunction peripheral device 200 includes several modules, such as a page separator module 238, a tile extraction module 240, a neutral page detection module 242, a color space conversion module 244, a chrominance adjustment module 246, and a transformation module 248. Each of the devices shown in device 200 may also be considered modules, and, therefore, the terms "device" and "module" are used interchangeably herein. Furthermore, the devices or modules illustrated in FIG. 2 are not meant to be limiting. It is to be understood that any number of elements or modules may be used and that additional operations or processes besides those described below may be provided.

The page separator module 238 receives the input 110 from the multifunction device 102. The input image 110, in some embodiments, is generated by the scanning engine 232 of the multifunction device 200. For example, an original document 109 may be scanned by the multifunction device, such as multifunction device 102 and/or 200. In other embodiments, the input image 110 is imported to the multifunction device 200 from either I/O interface 214 or network interface 210. As will be appreciated by those skilled in the art, the input image 110 contains image data that corresponds to multiple physical pages of an image or document. For example, an original document 109 may comprise one or more pages, when the original document is scanned, the image data from each page of the original document 109 is bundled into input image 110. The page separator module 238 processes the input image 110 such that the input image can be processed on a page by page basis, for example page 111. This subsequently provides faster processing times, improving the functionally of the multifunction device 200, as the image data can be determined as either color or grayscale and processed accordingly on such a page by page basis.

The tile extraction module 240 further splits the paged input image into tiles 116. Tiles 116 correlate to pixel areas of the image data. That is, a tile 116 may be representative of an area of 32×32 pixels. It is to be appreciated that a tile of any size may be generated, as other non-limiting examples, a tile may be defined as 16×32 pixels, 64×64 pixels, and 6624×32 pixels. In some embodiments, the tiles 116 may be processed in sequentially or in parallel. That is, tiles may be processed individually from left to right, and top to bottom. The first tile processed may be the top-left tile of the input image, and the last tile to be processed may be the bottom-right tile of the input image. In other embodiments, each tile is processed simultaneously on the same or different processors associated with the same device.

Generally, the input image contains image data in RGB color space. The conversion module 244 converts the "RGB" color space to a device independent color space such as a L*a*b* color space. Conversions from RGB to L*a*b* are known in the art, for example and without limitation, U.S. Pat. No. 9,025,222 "Scanner Calibration Using Inverse Matrix" which is incorporated by reference in its entirety herein.

The color detection module 242 analyzes an extracted portion of the input image 110 to determine if the extracted portion includes color data. In some embodiments, the color detection module 242 determines if a page 111 of an input image 110 includes color data. In other embodiments, the color detection module 242 determines if a tile 116 of a page 111 of an input image includes color data. The color detection module 242 allows for the separation of image data based on color. If a portion of the image data 110, for example and without limitation, a tile 116, does not include color data, the tile may be processed by simple 1D lookup tables 250. If a portion of the image data 110, again for example tile 116, includes color data, the tile 116 may be processed by methods more complex than 1D look up tables, for example and without limitation interpolation methods such as tetrahedral interpolation. This allows for faster processing since only color data is processed by the more complex interpolation methods. In other words, a single input image 110 can be processed with multiple different image conversions. In some embodiments, the neutral and non-neutral pixels of a tile may be determined based on determinations including, chroma calculation, luminance-based threshold adjustment, and a final count determination such as the method described in U.S. Pat. No. 8,775,281 which is incorporated by reference in its entirety herein.

The chrominance adjustment module 246 of the multifunction device 200 further processes a tile 116 that is determined to include color data. The chrominance adjustment module 246 performs a chrominance adjustment for each pixel in a color determined tile 116. That is, the a* and b* values of each pixel are analyzed to determine if the pixel is neutral or not. Based on the neutral pixel detection results, the adjustment module 246 for example sets the a* value and the b* value to 128 if a* and b* data is stored as 8 bits per pixel values (bpp) images. The chrominance adjustment is needed because for most neutral pixels in an 8 bpp image the a* and b* values will be somewhat deviated from 128 as the result of the quality of the input image, the RGB to L*a*b* conversion by the conversion module 244, as well as other processing in the image path.

The transformation module 248 further processes the tile 116 after the chrominance adjustment by the adjustment module 246. The transformation module 248 converts the tile from an L*a*b* to a CMYK color space using methods and formula that are more complex than 1D look up tables. In some embodiments, this color space transformation may be facilitated by a 3D Lookup table 251 with tetrahedral interpolation.

Figure 3:
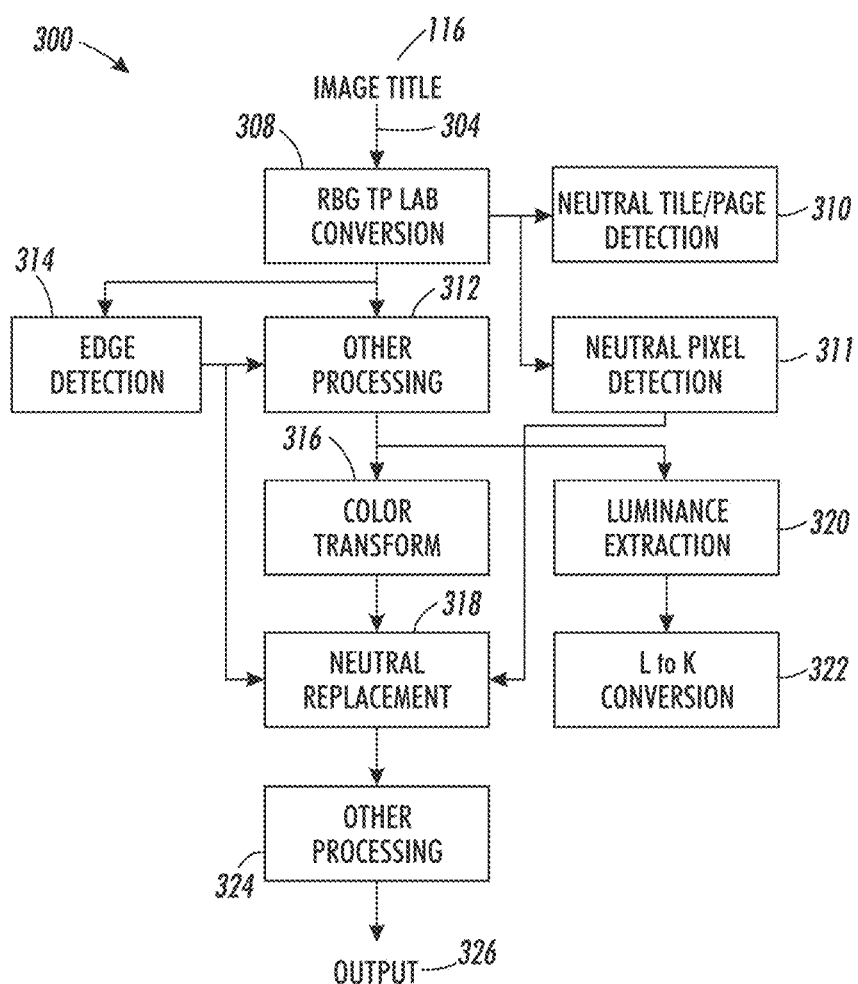
FIG. 3 illustrates current software-based image path with a tile type based LAB to CMYK conversion

FIG. 3 illustrates a simplified block diagram of a current software-based image path 300. The processing is facilitated by an image signal processor such as image signal processor 202 of FIG. 2. The image signal processor 202 is a digital signal processor (DSP) that can be found in some Systems on a Chip (SoC). The image signal processor 202 receives at 304, an image tile 116 for processing. The image tile 116 at 308, is converted from a device dependent color space, such as RGB, to a device independent color space, such as L*a*b* for analysis and manipulation. The processor 202, at 310 and 311 also detects and reports if a tile or page and/or pixel is neutral or it contains color content.

The Other Processing 312 block may include functions such as brightness adjustment, sharpening, background suppression, etc., possibly based on the result of edge detection at 314. The processed L*a*b* image is converted to device dependent color space, such as CMYK colors space via a complex color transform at 316. Generally, the complex color transform is a transform that is more complex than 1D look-up tables, such as tetrahedral interpolation.

The Neutral Replacement block 318 performs replaces some color components with an amount of black, for the purpose of avoiding color fringing around black text. The neutral replacement 318 is controlled by the edge detection 314/neutral pixel detection 311 tag.

Each pixel of the tile has a specific luminance L* and chrominance a* and b*. At the luminance extraction block 320, the luminance L* information for the pixels of the tile are extracted and isolated. The luminance L* is then converted to K (device black) at 322.

The Other Processing block 324 may perform functions including but not limited to appearance adjustment and rendering to binary for marking. In some embodiments, for the auto-color copy mode both CMYK and monochrome rendered binary images are generated while color page detection is in progress, and one of them is selected as output based on the final neutral tile or page detection result.

Figure 4:
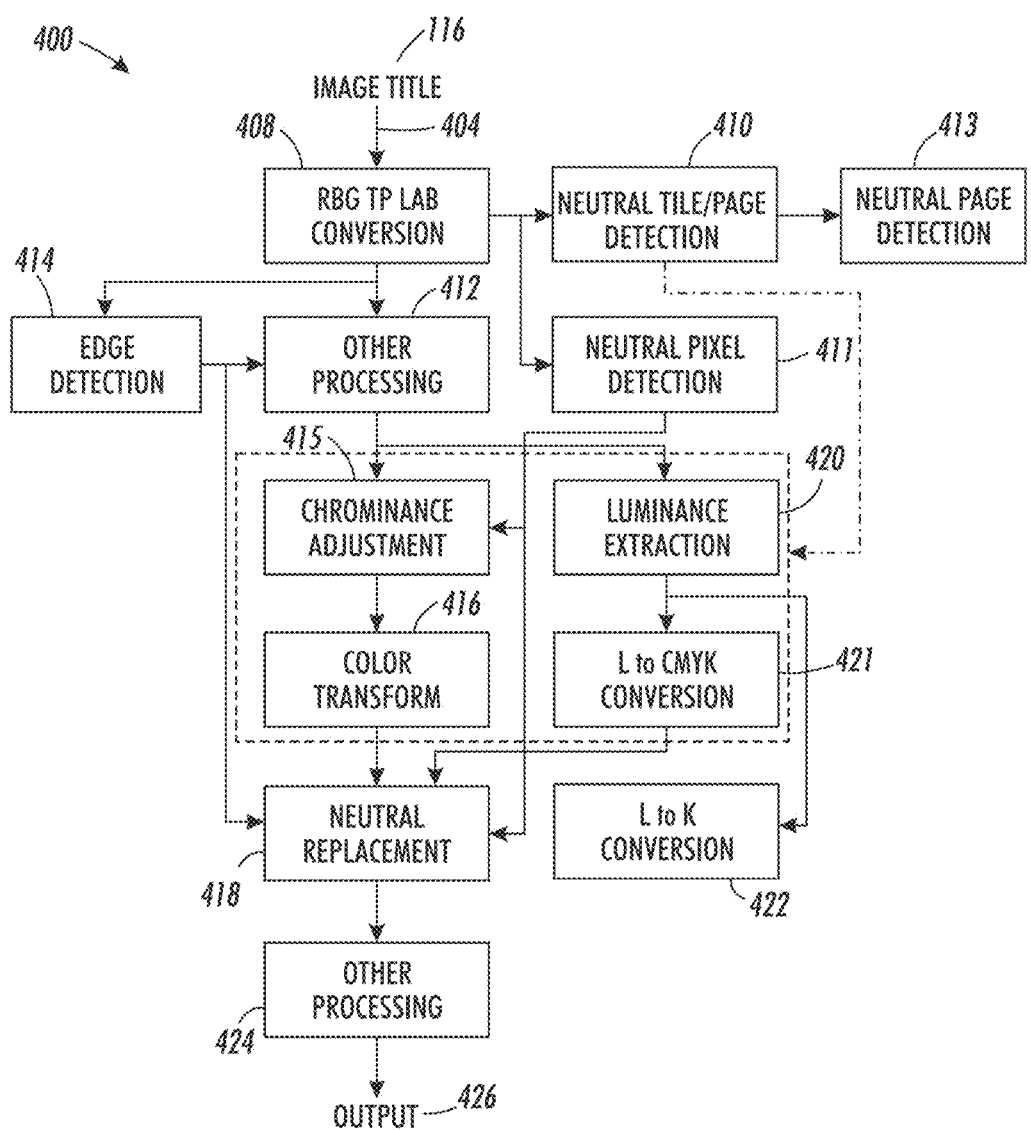
FIG. 4 illustrates a software-based image path with a tile type based LAB to CMYK conversion in accordance with one embodiment of the subject application.

FIG. 4 illustrates an exemplary image path 400 in accordance with the present disclosure. The exemplary image path 400 processes an image on a tile by tile basis. Here, the image path 400 includes a chrominance adjustment block 415 described in greater detail below. The the neutral tile detection block 410 may be part of the neutral page detection function 413. The L to CMYK conversion block 421 consists of 4 1D look-up tables that take the same L* input.

The processing is facilitated by at least one image signal processor such as image signal processor 202. The at least one image signal processor 202 is used to perform the first image signal process which is a conversion from a device dependent color space to a device independent color space. The at least one image signal processor 202 performs the first image signal process one tile at a time. That is, the at least one image signal processor 202 receives at 404, an image tile 116 for processing. The image tile 116 at 408, is converted from a device dependent color space, such as RGB, to a device independent color space, such as L*a*b* for analysis and manipulation. The at least one processor 202 performing the first image signal process at 410 and 411 also detects and reports if a tile and/or pixel is neutral or it contains color content.

Here, the chrominance adjustment block 415 for example sets the a* and the b* values to 128 if a* and b* data is stored as 8 bits per pixel values (bpp) images, based on neutral pixel detection results from block 410. The 1D L* to CMYK TRCs of block 421 can be derived from the 3D LUT designed for tetrahedral interpolation. In some embodiments, a neutral sweep is run through the interpolation process and the output values are recorded. The chrominance adjustment block 415 is needed in the image path 400 because, for must neutral pixels, the a* and b* values will deviate from 128 as the result of the quality of the input image, the first image signal process (the RGB to CIELab conversion), as well as other processing in the image path. If these pixels are put through the more complex color conversation methods, such as tetrahedral interpolation, as they are, then the off neural notes will participate in the interpolation process, resulting in CMYK values different from the results obtained by applying a simple 1D L* to CMYK TRC (with the chrominance channels ignored).

The at least one image signal processor 202, is also configured to perform a second image signal process 419 transforming a tile 116 from device independent to device dependent color space, such as CMYK. For a tile 116, determined to be neutral by the image signal processor 202, the at least one image signal processor 202 converts the tile 116 to device dependent color space utilizing 1D Look-up tables 316. For tiles, such as tile 116, determined to contain color, the second image signal process 419 converts the tile 116 to device dependent color space by performing a chrominance adjustment 415 on neutral pixels of the tile and extracting the luminance value at block 420. In some embodiments, the luminance value is computed directly (extracted) from the RGB values using the luminance equation (e.g. Luminance=0.3R+0.59G+0.11B). The second image signal process 419 also transforms the pixels of a color containing tile by methods and formula more complex than 1D look up tables at block 416. For example and without limitation, tetrahedral interpolation is used to covert the pixels of a color containing tile.

The Neutral Replacement block 418 performs replaces some color components with an amount of black, for the purpose of avoiding color fringing around black text. The neutral replacement 418 is controlled by the edge detection 414/neutral pixel detection 411 tag.

Each pixel of the tile has a specific luminance L* and chrominance a* and b*. At the luminance extraction block 420, the luminance L* information for the pixels of the tile are extracted and isolated. The luminance L* is then converted to K (device black) at 422.

The image path 400 may also include other processing 424 after the image is converted to the device dependent color space, e.g. converted to CMYK color space. The fully processed image is then output at 426. In some embodiments, the output 426 sends the processed image to a printer engine, such as printer engine 230, for printing the processed image.

Figure 5:
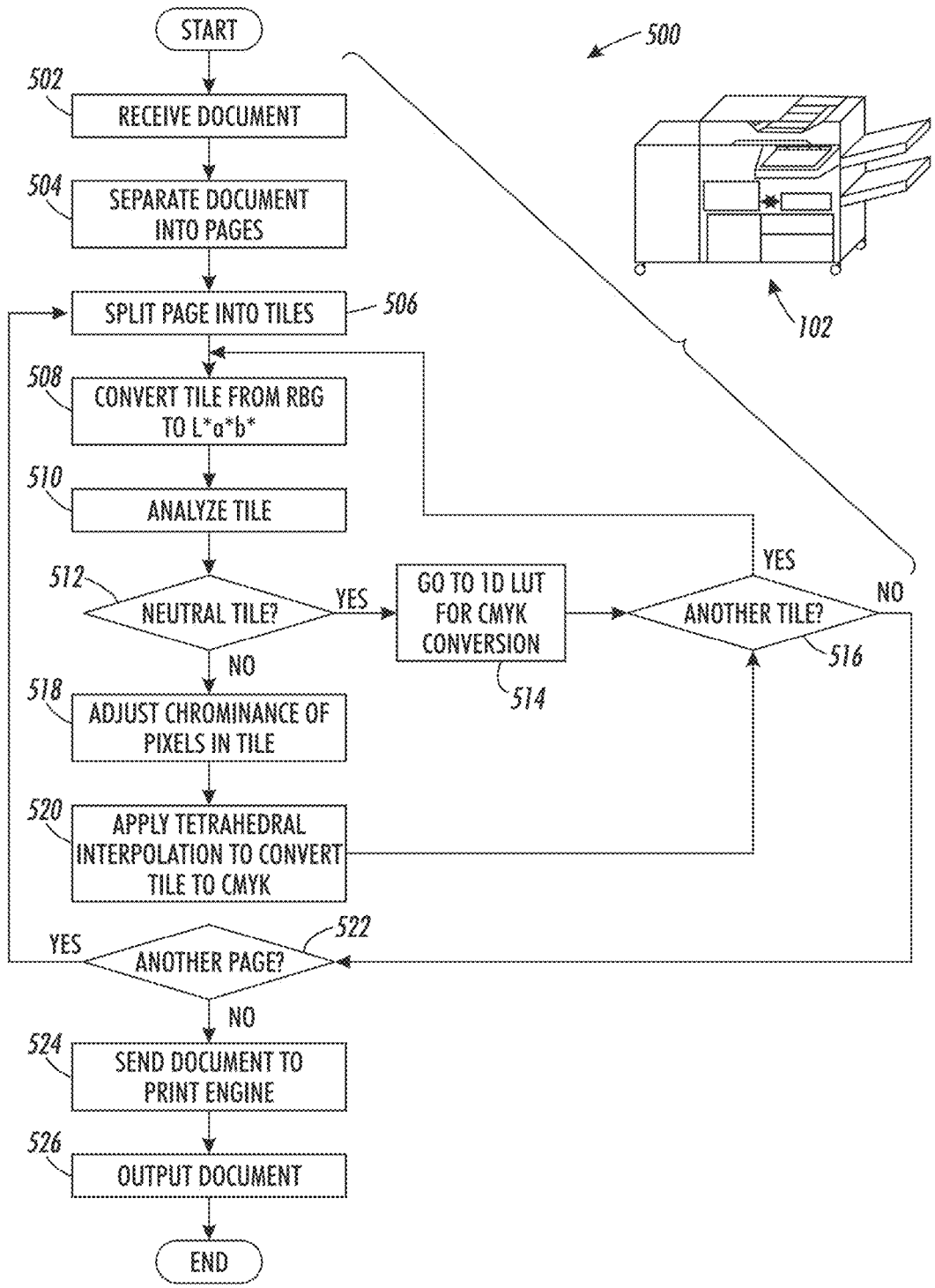
FIG. 5 is a flowchart illustrating a method of tile type based color conversion in accordance with one embodiment of the subject application.

Turning now to FIG. 5, there is shown a flowchart 500 illustrating a method for color conversion according to one embodiment. In particular, flowchart 500 depicts a method for converting a document from L*a*b* color space to CMYK color space utilizing one-dimensional and three-dimensional conversion processes. The methodology of FIG. 5 begins at 502, whereupon an input image, such as input image 110 of FIG. 1, is received by the at least one image signal processor 202 of the multifunction device 102. That is, the input image 110 may be received via copying, scanning, printing, or other operations associated with the multifunction device 102. In some embodiments, the at least one image signal processor 202 then separates the input image 110 into individual pages 111 at 504 corresponding to each page of the original document 109.

At 506, the image signal processor 202 splits a page 111 into tiles 116. It will be appreciated that the tiles may be representative of any suitable split of a page 111 of the input image 110. In one embodiment, each tile 116 corresponds to 16 by 32 pixels, although it will be appreciated that other size tiles may be used. In some embodiments, the number of tiles 116 and tile size is predetermined by settings in the multifunction device. In other embodiments, the number of tiles 116, and tile size is dependent on the size of the image 110.

At 508, the at least one image signal processor 202 performs a conversion from "device dependent color space" to device independent color space. As previously discussed, "device dependent" color space or image data is a color scheme which is tied to or related to color production by a machine, such as a printer, scanner or monitor. Typical device "dependent color spaces", include for example and without limitation red-green-blue (RGB) or cyan-magenta-yellow-black (CMYK) color spaces. On the other hand, "device independent" color space, is a color scheme which is not tied to the color production by a machine. Typical device independent color spaces include, for example and without limitation, CIE XYZ and CIE L*a*b* color spaces. Device dependent color space values, such as RGB and CMYK, may be converted to a device independent color space and vice-versa. Conversion from device dependent color space to device independent color space may be accomplished for example and without limitation by using transformation algorithms and/or look-up-tables (LUT), as known in the art.

After the conversion from RGB to L*a*b* at 508, each tile 116 is analyzed at 510 for color content. That is, each tile 116 is evaluated for black and white (or gray) pixels of image data or color pixels in the image data. If no color pixels or content are detected, i.e. the tile is a neutral tile, then, at 514, a simple 1-dimension L* to CMYK conversion is performed using a look-up-table (LUT) 250 or a tone reproduction curve (TRC) 252. In some embodiments, the neutral and non-neutral pixels of a tile may be determined based on determinations including, chroma calculation, luminance-based threshold adjustment, and a final count determination, such as the method described in U.S. Pat. No. 8,775,281.

If the at least image signal processor 202 detects that the tile 116 contains color pixel data, i.e. the tile 116 is not neutral, then the chrominance of the pixels in the tile are adjusted at 518 by the at least one image signal processor. In one embodiment, the chrominance adjustment step 518 for example sets the a* value and the b* value to 128 if a* and b* data is stored as 8 bits per pixel values (bpp) images, based on neutral pixel detection results, (looking at the a* b* values for each and every pixel). In some embodiments, the 1D L* to CMYK TRCs can be derived from the 3D LUT designed for tetrahedral interpolation. This can be achieved by running a neutral sweep through the interpolation process and recording the output values. It will be appreciated by those skilled in the art that the chrominance adjustment step 518 may be needed because for most neutral pixels the a* and b* values will be somewhat deviated from 128 as the result of the quality of the input image and the RGB to L*a*b* conversion at 508. If these pixels are put through tetrahedral interpolation as they are then the off-neutral nodes will participate in the interpolation process, resulting in final CMYK values which will be different from the result obtained by applying a simple 1D L* to CMYK TRC (with the chrominance channels ignored).

At 520, a transformation is performed via formula which is more complex than 1D table looking up, for example and without limitation, a tetrahedral interpolation is applied by the at least one processor 202 to the tile 116 to convert from L*a*b* to CMYK color space. Once the tile 116 is converted to device dependent color space, either at step 514 or 520, the process restarts at 508 for the next tile. Once each tile 116 associated with a page 111 has been evaluated and converted, the method 500 evaluates the input image 110 at 522 to determine if another page exists. Upon detection of another page, the process restarts at 506, wherein the next page is split into tiles 116. When no more pages, the processed image is sent to the print engine 230 at 524, wherein a copy of the original document 110, is produced at 526.

Figure 6:
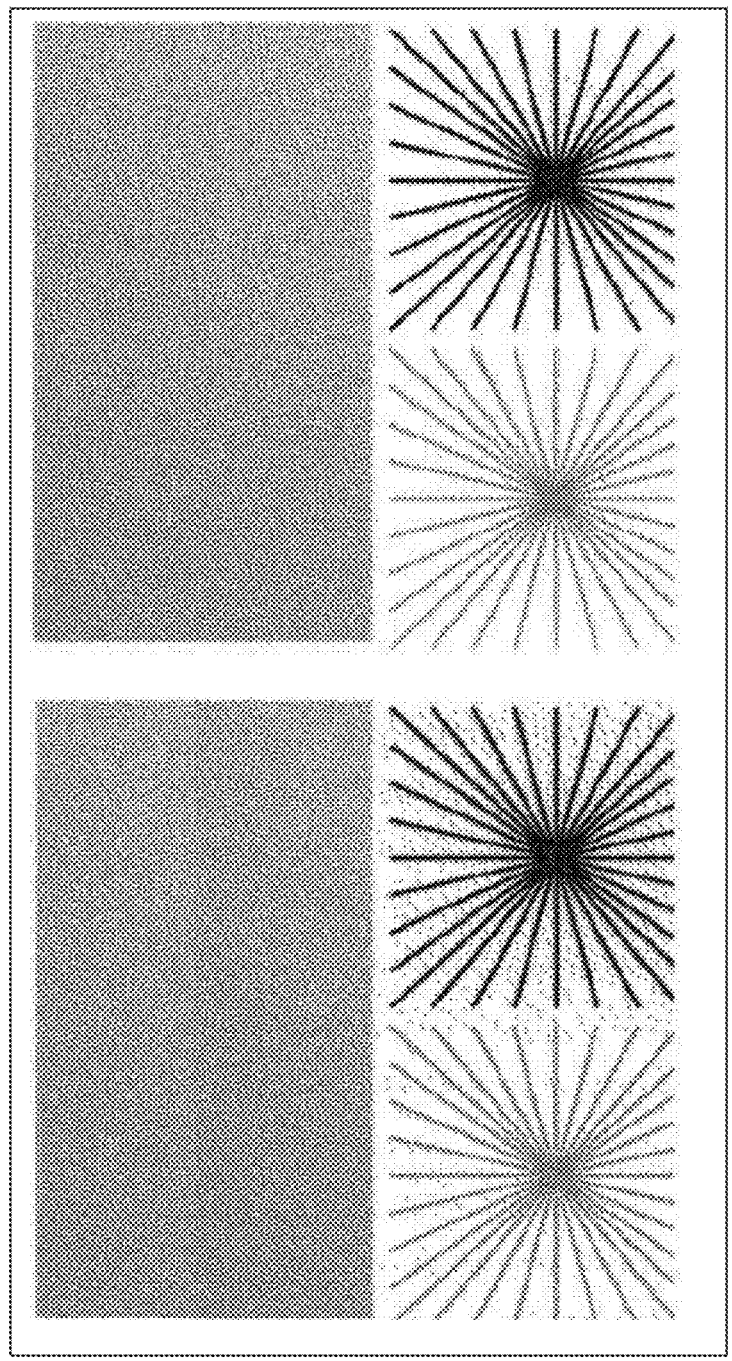
FIG. 6 is a photograph of the effect of the chrominance adjustment step in accordance with one embodiment of the subject application.

FIG. 6 shows portions of two CMYK images with the one on the left without the chrominance adjustment step and the one on the right with the chrominance adjustment. In order to best illustrate the appear difference only the magenta plane of the same image is shown. Without the chrominance adjustment, there may be an appearance difference between a portion of the same neutral patch that's in a tile detected as neutral and a portion that is in a tile detected as color because of other color content in the tile.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A method for tile type based color space transformation, the method comprising:
   with at least one image signal processor, splitting an input image into a plurality of tiles, each tile comprising a plurality of pixels; and
   performing a color space transformation, the color space transformation comprising:
      determining the presence of color data within a tile of the plurality of tiles;
      upon a determination that no color data is present within the tile, converting the plurality of pixels of the tile from a device independent color space to a device dependent color space via a one-dimensional look-up table; and
      upon a determination that color data is present within a tile, adjusting chrominance of neutral pixels of the plurality of pixels, and converting the plurality of pixels from the device independent color space to the device dependent color space using a method more complex than one-dimensional look up tables.

2. The method according to claim 1, further comprising segmenting the input image into a plurality of pages before segmenting into the plurality of tiles.

3. The method according to claim 1 wherein the method more complex than one dimensional look up tables is tetrahedral interpolation.

4. The method according to claim 1, further comprising with the at least one image signal processor, converting the tile from a first device dependent color space to the device independent color space.

5. The method according to claim 4, wherein the first device dependent color space is an RGB color space.

6. The method according to claim 1, wherein the device independent color space is a LAB color space.

7. The method according to claim 1, wherein the device dependent color space is a CMYK color space.

8. The method according to claim 1, wherein the input image is received by the image signal processor from a scanning device.

9. The method according to claim 1, wherein the color space transformation is performed on each tile of the plurality of tiles.

10. A system comprising memory storing instructions for performing the method of claim 1, and a processor in communication with the memory executing the instructions.

11. A multifunction device for tile type based color space transformation comprising:
   at least one image signal processor and a memory in communication therewith, wherein the memory stores instructions which are executed by the at least image signal processor to:
   receive an input image;
   separate the input image into a plurality of tiles, wherein each tile of the plurality of tiles comprises a plurality of pixels;
   determine the presence of color data within a tile of the plurality of tiles;
   upon a determination that no color data is present within the tile, convert the plurality of pixels of the tile from a device independent color space to a device dependent color space via a one-dimensional look-up table; and upon a determination that color data is present within a tile, perform a chrominance adjustment on neutral pixels of the plurality of pixels and convert the plurality of pixels from the device independent color space to the device dependent color space using a method more complex than one-dimensional look up tables.

12. The multifunction device according to claim 11, wherein the method more complex than one dimensional look up tables is tetrahedral interpolation.

13. The multifunction device according to claim 11, further comprising a scanning device for generating the input image.

14. The multifunction device according to claim 11 further comprising instructions which are executed by the image signal processor to convert the tile from a first device dependent color space to the device independent color space.

15. The multifunction device according to claim 14, wherein the first device dependent color space is an RGB color space.

16. The multifunction device according to claim 11, wherein the device independent color space is a LAB color space.

17. The multifunction device according to claim 11, wherein the device dependent color space is a CMYK color space.

18. The multifunction device according to claim 11, wherein the color space transformation is performed on each tile of the plurality of tiles.

19. The multifunction device according to claim 11, further comprising a print engine configured to print an output image, wherein the output image is an image wherein the color space has been converted from the device independent color space to the device dependent color space.

20. A system for tile type based color space transformation comprising:

at least one image signal processor configured to receive an input image;

a memory in communication therewith;

a tile segmentation module in communication with the image signal processor configured to split the input image into a plurality of tiles, each tile comprising a plurality of pixels;

a color conversion module in communication with the at least one image signal processor configured to convert each tile of the plurality of tiles from a device dependent color space to a device independent color space;

a color detection module in communication with the at least one image signal processor configured to detect a presence and an absence of color data within each tile of the plurality of tiles;

a 1D conversion module in communication with the at least one processor wherein upon detection of the absence of color data within a tile of the plurality of tiles, the 1D conversion module converts the tile from the device independent color space to a device dependent color space;

a chrominance adjustment module in communication with the at least one processor, wherein upon detection of the presence of color data within a tile of the plurality of tiles the adjustment module adjusts the chrominance of each neutral pixel of the plurality of pixels;

a color transformation module in communication with the at least one processor, wherein upon detection of the presence of color data within a tile of the plurality of tiles the color transformation module converts the tile from the device independent color space to a device dependent color space utilizing tetrahedral interpolation.

* * * * *